United States Patent Office 2,988,227
Patented June 13, 1961

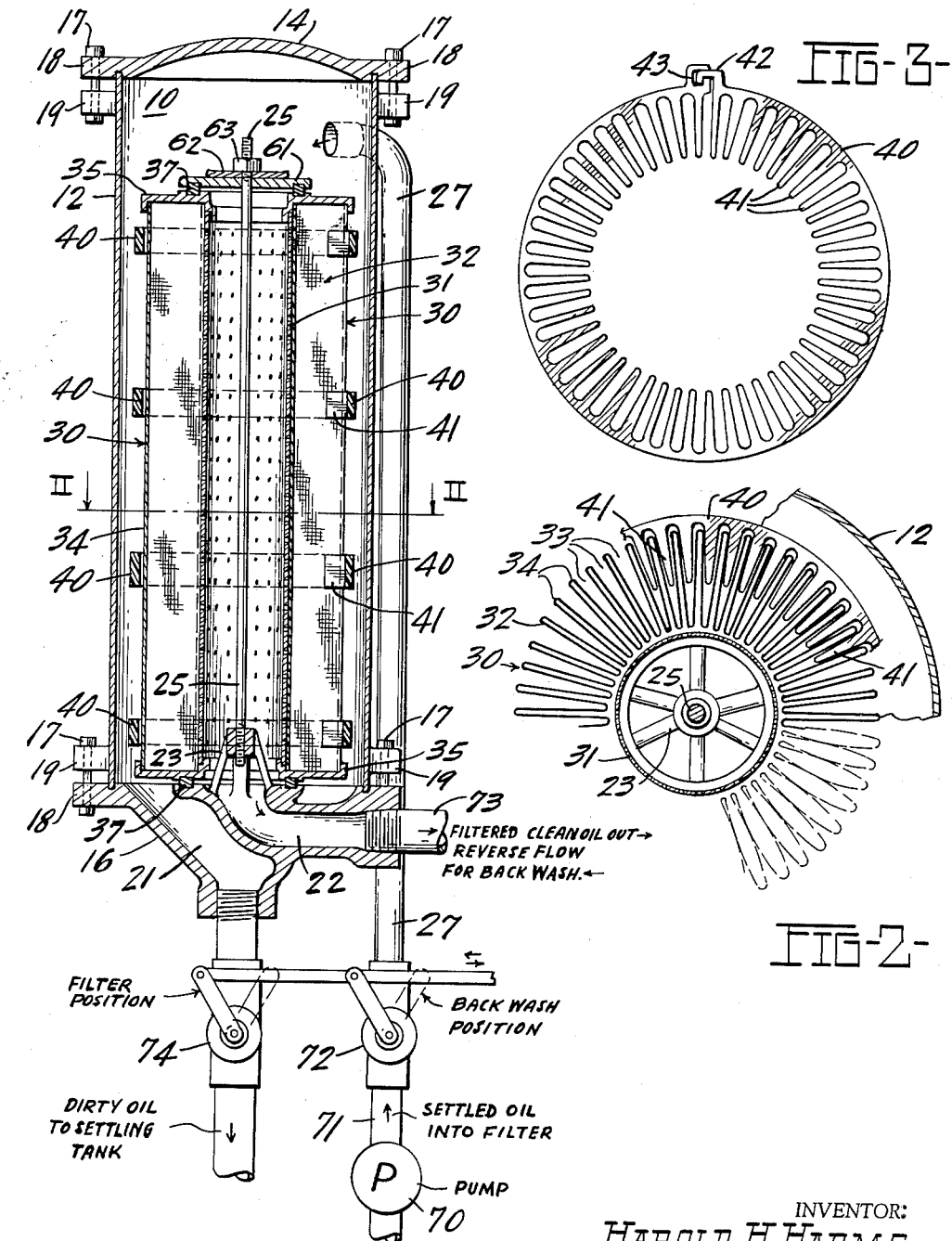

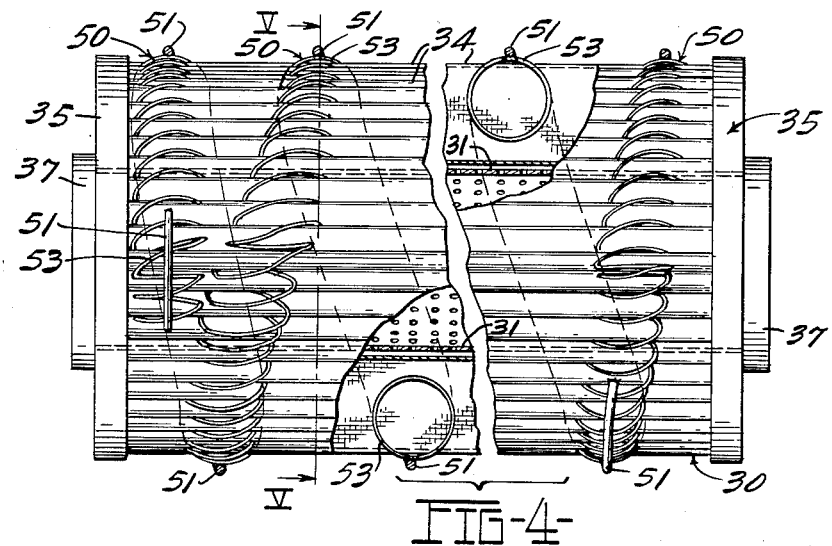
FIG-4-
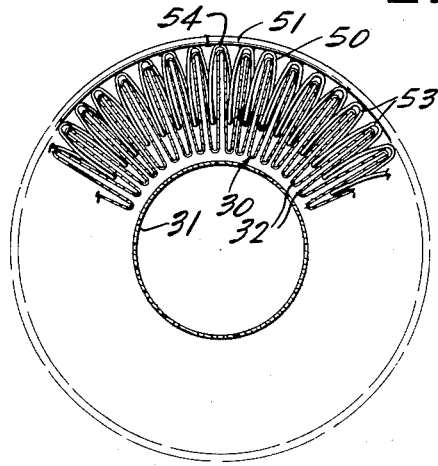
FIG-5-
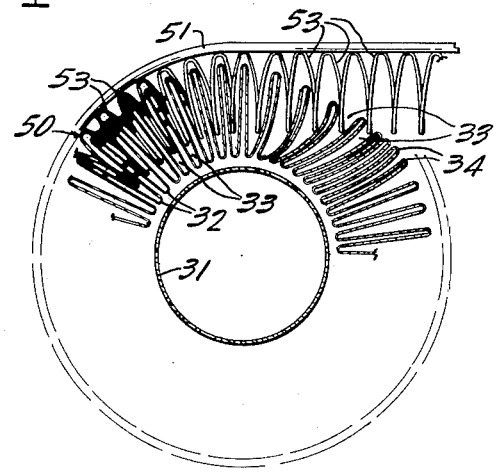
FIG-7-
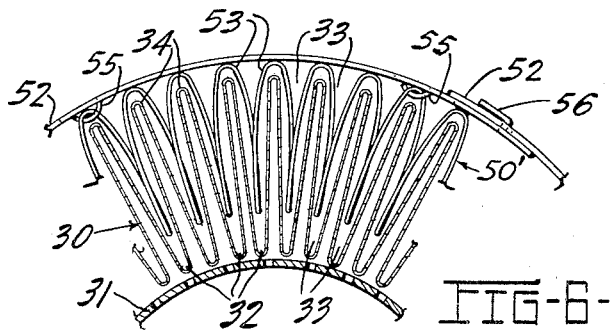
FIG-6-
INVENTOR:
HAROLD H. HARMS,
BY
ATTY.

2,988,227
PLEATED FILTER
Harold H. Harms, 1404 Palmetto St., Toledo 6, Ohio
Filed Mar. 3, 1958, Ser. No. 718,846
8 Claims. (Cl. 210—493)

This invention relates to an improvement in a pleated filter. More particularly, it deals with such a pleated filter having a reinforcing spacer which keeps the adjacent folds of a folded filtering element constantly spaced or divided even though a deforming force may be applied thereto.

Previously, when cooling liquids or coolants are circulated through automatic cutting or grinding machines, they become contaminated with cuttings or swarf; and, therefore, in order for said coolants to be recirculated through said cutting and grinding machines, said cuttings and swarf must be removed therefrom. The larger solid particles dispersed or suspended in said cooling liquids may be removed by a "Liquid Clarification System" such as that disclosed in Harold H. Harms copending application Serial No. 554,532, now Patent No. 2,861,688, or in conventional large settling tanks. However, some of the particles suspended or dispersed in said coolants may be of such a density and/or be of such microscopic size that they are not completely removed by such apparati. Therefore an additional filtering medium must often be used even in combination with the above apparatus, such as for example, a bank of backwashable filters to remove said smaller particles, each of said filters being backwashed consecutively so that the remaining filters might still be used for continuous operation of the system. One type of filter element chosen for said filters was commercially available disposable type cartridges, such as those used in oil filters; which usually comprise a pleated paper surrounding an inside perforated cylinder, both being enclosed by an outside perforated metal or cardboard cylinder. However, it was soon discovered that these commercially available cartridges had a very short filtering life because they became clogged due to the inability of the accumulated particles to pass through the outer perforated cylinders. Also the adjacent folds in the pleated filter in the cartridge often stuck together decreasing filtering efficiency and were also deformed and stick together when backwashed due to the pressure used to backwash said filter; and the particles accumulated thereon were not completely released during the backwashing operation.

Accordingly, it is an object of this invention to produce an efficient, simple, effective, economic and long-lived backwashable pleated filter cartridge.

Another object of this invention is to provide an efficient, simple, effective, economic and easy to install reinforcing and fold spacing means for a pleated filter element for such a cartridge.

Another object of this invention is to provide such a pleated filter reinforcing spacing means which is resilient, i.e. permits a limited amount of deformation, such as due to the pressure applied on it during backwashing, whereby the particles may be more easily removed from the pleats of the filter, and then it automatically recovers its normal configuration when the backwashing or other deforming forces are removed.

Generally speaking, this invention comprises a new disposable pleated filter cartridge having a reinforcing spacer for the pleats thereof. Such a filter cartridge usually comprises a central perforated metal cylinder or tube with a pleated (paper) filtering element extending radially from its outside periphery, and a helical or plurality of circular bands of a reinforcing spacer means surrounding the cylindrical pleated filtering element. This reinforcing spacing band means may comprise a plurality of resilient, internally-finned or toothed rings spaced along the length of the cartridge and adapted to fit over the end of or wrap around the periphery of said pleated filtering element with said teeth or fins fitting in between adjacent pleats so as to keep them spaced apart from one another and to maintain them in their original shape particularly when the filter element is backwashed. Alternately, said reinforcing spacing band means may comprise a coiled helical spring with each pleat of said filter element being interposed between each coil of said spring; the path of said spring generating a helix along the cylindrical surface of said filtering element.

The above mentioned and other features and objects of this invention and the manner of attaining them will become more apparent and the invention itself will be best understood by reference to the following description of embodiments of the invention taken in conjunction with the accompanying drawings, wherein:

FIG. 1 is a longitudinal sectional view of an embodiment of a pleated filter cartridge with a reinforcing spacer means according to this invention mounted in a chamber connected for backwashing of the filtering cartridge;

FIG. 2 is a section taken through line II—II of FIG. 1 with parts broken away showing details of the intermeshing of the reinforcing spacer means and the pleated filter medium and of the flow of the coolant therethrough;

FIG. 3 is a plan view of the resilient internally-finned reinforcing spacer means shown in FIG. 2;

FIG. 4 is a side view of a pleated filter cartridge having another embodiment of the reinforcing spacer means comprising a coiled helical spring;

FIG. 5 is a section taken along line V—V of FIG. 4 showing the intermeshing of the pleated filter medium and the coils of the helical spring;

FIG. 6 is an enlarged detailed view of FIG. 5 showing a clasp which may be used to fasten a retaining strip around bands of such a spring to restrict their outward expansion during backwashing; and FIG. 7 is a transverse sectional view of the filter cartridge similar to that shown in FIG. 5, illustrating how a reinforcing spring means such as a coiled helical spring may be installed on a pleated filter element.

Referring to FIG. 1, there is shown a filtering cartridge chamber 10 which may comprise a cylindrical side wall 12 with a removable top or lid portion 14, and a bottom portion 16. The top and bottom portions 14 and 16 may be attached to said side wall 12 by any desired fastening means such as bolt and nut means 17 connected between a flange 18 on the top or bottom portions and lugs 19 around the adjacent ends of the wall 12. The bottom portion 16 may contain ducts 21 and 22 and have a V-shaped riser portion 23 extending into the interior of said filter chamber 10, which riser portion 23 may have a rod 25 threaded thereinto. Into the side wall 12 of the chamber 10 there is also provided another duct 27, preferably located near the top or other end of the chamber from the ducts 21 and 22.

The filtering element or medium used in said filtering chamber 10 may be a disposable-type cartridge filter 30, which cartridge 30 may comprise an inner perforated (metal) sleeve 31, a pleated filtering material (paper) 32 having spaces 33 (see FIG. 2) between adjacent folds or pleats 34, which pleats 34 may extend substantially radially from the outside periphery of said inner sleeve or support 31. Flanged end plates 35 may fasten such as by glue or other adhesive, to the end edges of said pleated filtering material 32 and to said inner sleeve 31 so as to form an integral cartridge 30. Gasket means 37 may be attached to said end plates 35.

In order to maintain the spaces 33 between the adjacent pleat 34 of the filtering element 32, the reinforcing spacer means of this invention is utilized; such as, for example, the embodiment thereof shown in FIG. 3, which may comprise a resilient band 40, which may be constructed of plastic, metal, etc., having a plurality of inwardly directed teeth or fins 41, and a fastening means, such as cooperating hook 42 and slot 43, so that the periphery of the band 40 forms a closed curve. The fins 41 of the reinforcing spacer means 40 may be placed in the spaces 33 between adjacent pleats 34 of the filter cartridge 30 so that said pleats 34 and said fins 41 intermesh and thereby maintain the spaces 33 between adjacent pleats 34. The number of these reinforcing spacer bands means which may be utilized along the length of a single filter cartridge 30 is arbitrary, however, it is preferable to use at least three such reinforcing spacer means 40.

Alternately, the reinforcing spacer means may be a helical spring 50 or 50' (see FIGS. 4 and 5 or 6) which may have a reinforcing wire 51 or strip 52 (see FIG. 6) fastened along one side of its coils 53 by any desired fastening means, such as welding 54 (see FIG. 5) or clips 55 (see FIG. 6). The spring 50 may be applied to the filter cartridge 30 by intermeshing the coils 53 of said spring 50 with the pleats 34 of said filter cartridge 30 (see FIG. 7) and the outline of the spring 50 may trace a helix along the length of said filter cartridge 30 (see FIG. 4). If a plurality of spaced circular helical spring bands are used as the bands 40, the adjacent ends of their holding strips 52 may be held together by a hook and slot fastening means 56 (see FIG. 6) instead of the means 42 and 43 shown in FIG. 3.

The filter cartridge 30 along with its reinforcing spacer means 40 or 50 may be inserted into the filter chamber 10 (see FIG. 1) so that said rod 25 may extend through the center of said cartridge 30. Said cartridge 30 may then be securely held in place by a clamping plate 61 and a washer 62 which may be placed on said rod 25 so that they abut against the gasket 37 on said cartridge 30 and may then be tightened by a nut 63.

The liquid to be filtered, such as the coolant from a settling tank may be pumped via a pump 70 into the filtering chamber 10 for further filtration via a pipe 71 which may have a valve 72 in open position connecting it to duct 27 for introduction of the liquid to be filtered near the top of said filtering chamber 10. The liquid to be purified then flows into the chamber 10 around the cartridge 30 and from the outside periphery of the pleated filtering element 30 through said filtering medium 32, and the perforations in central sleeve 31 into the duct 22 in the bottom 16 of said filtering unit 10 out through a pipe 73, which may lead to a supply tank of purified coolant (not shown). After the above filtering process has continued for a period of time, the spaces 33 between the pleats 34 in said filter cartridge 30 may become clogged with the contaminants that were in the liquid or coolant; and the filter cartridge 30 may then be backwashed automatically or manually to relieve this clogged condition. To backwash the filter cartridge 30, the valve 72, which may be coupled to a normally closed valve 74 is operated to open valve 74 and close valve 72 so that a quantity of purified oil from the supply tank (not shown) may be forced or pumped back through the pipe 73, duct 22, and perforated sleeve 31 to flush the contaminants from the spaces 33 in the filter cartridge 30 out through the duct 21 in the bottom 16 of the filtering chamber 10 to the settling tank; which backwashing process may occur automatically at definite timed intervals.

Thus, with a pleated filter, disposable or not, embodying a reinforcing spacer means 40, or 50' according to this invention, improved results can be had including removal of the sludge and contaminats by backwashing without collapsing or blowing out of the pleats 34 of the filter element 30, thereby increasing the useful life of such pleated filtering elements many times.

Although the reinforcing spacer means of this invention has been described in connection with backwashable filters, it may be utilized also for any filter cartridges for other purposes, whether backwashing is employed or not, including automotive and truck oil filters, etc., without departing from the scope of this invention.

While there is descrbied above the principles of this invention in connection with specific apparatus, it is to be clearly understood that this description is made only by way of example and not as a limitation to the scope of this invention.

What is claimed is:

1. A filter cartridge having a fibrous pleated filter element, a perforated rigid support for one side of said pleated filter element and adjacent the folded edges of said pleats on said one side thereof, end plates attached to said support and to the ends of said filter element whereby the fluid to be filtered is directed transversely through said element and said perforations in said support, a spacer means extending transversely across said pleats on the other side of said filter element and contacting the other folded edges on said other side thereof for holding said filter element adjacent said support, said strip means including spaced projections extending toward said support between adjacent ones of said pleats, said projections being shorter than the depth of said pleats so that the outer ends of said projections are spaced from the inside of the folds in said pleats, and the sides of said projections contact the sides of said pleats to maintain the spaces between said pleats.

2. A cartridge according to claim 1 wherein said strip means comprises a plurality of separate toothed bands with their teeth being said projections intermeshed with said pleats.

3. A filter cartridge according to claim 1 wherein said projections comprise the coils of a helical spring which are intermeshed with said pleats.

4. A filter cartride comprising a perforated sleeve, a pleated filtering material surrounding said sleeve and having its pleats extending axially thereof, and annular end plates attached to said perforated sleeve and to the ends of said pleated filtering material, whereby the fluid to be filtered is directed radially through said material and said perforations of said sleeve and axially of said sleeve, the improvement comprising: a reinforcing spacer means surrounding said pleated filtering material and having portions projected inwardly between said pleats of said filtering material to maintain the spacing between said pleats, and to hold said material adjacent said sleeve, said projected portions contacting the sides of said pleats to maintain the spaces between said pleats.

5. A reinforcing spacer for a cylindrical pleated filter comprising a surrounding band, teeth mounted on said band for inter-position between adjacent pleats of said filter, said teeth extending short of the valley folds in said pleats and the sides of said teeth contacting the sides of said pleats to maintain the spaces between said pleats, and means for maintaining said teeth between said pleats.

6. In a filter cartridge having a central perforated tubular support, a pleated fibrous sheet filter element surrounding said support with its pleats extending axially thereof with their inside folded edges adjacent the outside of said tubular support, and a pair of annular end plates attached to the ends of said support and covering the ends of said filtering element whereby the fluid to be filtered is directed radially through said element and said perforations of said support and axially through the center of said support, the improvement comprising: spacer means surrounding said filter element and contacting the outside folded edges of said filter element at axially spaced intervals between said end plates for maintaining said filter element against said support, said spacer means having a plurality of projections extending radially inwardly toward said support between each adjacent pair of pleats of said element for maintaining the spacing between said pleats of said element the sides of said projections contacting adjacent sides of said pleats to maintain said spacings between said pleats.

7. A cartridge according to claim 6 wherein said spacer means and projections comprise a plurality of separate toothed bands wherein the teeth on said bands comprise said projections.

8. A cartridge according to claim 7 wherein said bands have two ends and said ends include interlocking hook means.

References Cited in the file of this patent

UNITED STATES PATENTS

| | | |
|---|---|---|
| 19,335 | Ballard | Feb. 16, 1858 |
| 137,653 | Brown | Apr. 8, 1873 |
| 142,217 | Ellis | Aug. 26, 1873 |
| 1,906,984 | Lyman | May 2, 1933 |
| 2,014,105 | Dooley | Sept. 10, 1935 |
| 2,463,137 | Bahlke | Mar. 1, 1949 |
| 2,564,637 | Chase | Aug. 14, 1951 |
| 2,598,210 | Beacham | May 27, 1952 |

FOREIGN PATENTS

| | | |
|---|---|---|
| 2,328 | Great Britain | 1858 |
| 655,385 | Great Britain | July 18, 1951 |
| 764,846 | Great Britain | Jan. 2, 1957 |
| 61,166 | France | Oct. 13, 1954 |

(Addition to 993,142)

UNITED STATES PATENT OFFICE
CERTIFICATE OF CORRECTION

Patent No. 2,988,227                                                                June 13, 1961

Harold H. Harms

It is hereby certified that error appears in the above numbered patent requiring correction and that the said Letters Patent should read as corrected below.

Column 4, lines 29 and 37, for "strip", each occurrence, read -- spacer --.

Signed and sealed this 10th day of August 1965.

(SEAL)
Attest:

ERNEST W. SWIDER                                            EDWARD J. BRENNER
Attesting Officer                                                  Commissioner of Patents